(12) United States Patent
Mohanasundaram et al.

(10) Patent No.: US 10,286,536 B2
(45) Date of Patent: May 14, 2019

(54) TOOL HOLDER CONNECTION SYSTEM

(71) Applicant: Black & Decker Inc., Newark, DE (US)

(72) Inventors: Suthan Mohanasundaram, Harrow Weald (GB); Norbert Hahn, Hunstetten-Limbach (DE); Tobias Heep, Steinbach (DE)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/416,599

(22) Filed: Jan. 26, 2017

(65) Prior Publication Data
US 2017/0217005 A1    Aug. 3, 2017

(30) Foreign Application Priority Data

Feb. 2, 2016 (GB) .................................. 1601856.6

(51) Int. Cl.
B23B 31/107 (2006.01)
B25D 17/08 (2006.01)
(Continued)

(52) U.S. Cl.
CPC ........ B25D 17/088 (2013.01); B23B 31/1071 (2013.01); B25D 17/084 (2013.01);
(Continued)

(58) Field of Classification Search
CPC . B23B 31/1071; B23B 31/008; B25D 17/084; B25D 17/088; B25D 16/00;
(Continued)

(56) References Cited

U.S. PATENT DOCUMENTS 7,258,349 B2 * 8/2007 Frauhammer ............ B23Q 3/12
279/19
9,221,165 B2 * 12/2015 Wiedner ............... B25D 17/088
(Continued)

FOREIGN PATENT DOCUMENTS

DE 102006057934 A1 * 6/2008 ............. B23B 31/11
EP 1477281 11/2004
(Continued)

OTHER PUBLICATIONS

Extended EP Search Report dated Jun. 20, 2017 issued in corresponding EP application 16191940.2.

Primary Examiner — Eric A Gates
Assistant Examiner — Chwen-Wei Su
(74) Attorney, Agent, or Firm — Amir Rohani; Scott B. Markow

(57) ABSTRACT

A tool holder system with first and second spindles, a locking ring slideably mounted on the first spindle, a first biasing mechanism biasing the locking ring towards an indentation position where the locking ring surrounds an indentation on the first spindle, and a moveable locking element mounted on the second spindle, the locking element being engageable to the indentation. The first spindle can be unlocked from the second spindle by sliding the locking ring away from the indentation position against the biasing force of the biasing mechanism and towards the second spindle. Such action moves the locking element to disengage from the indentation.

8 Claims, 10 Drawing Sheets

(51) Int. Cl.
*B25D 16/00* (2006.01)
*B23Q 3/12* (2006.01)

(52) U.S. Cl.
CPC ............ *B23Q 3/12* (2013.01); *B25D 16/00* (2013.01); *B25D 2217/0042* (2013.01); *B25D 2217/0053* (2013.01); *Y10S 279/905* (2013.01); *Y10T 279/17145* (2015.01)

(58) Field of Classification Search
CPC .... B25D 2217/0053; B25D 2217/0042; Y10T 279/17085; Y10T 279/17145; Y10S 279/905; Y10S 279/906
See application file for complete search history.

(56) References Cited

U.S. PATENT DOCUMENTS

| | | | |
|---|---|---|---|
| 2001/0017447 A1 | 8/2001 | Baumann et al. | |
| 2002/0179310 A1* | 12/2002 | Kuhnle | B23Q 3/12 173/114 |
| 2005/0161242 A1* | 7/2005 | Frauhammer | B23Q 3/12 173/29 |
| 2007/0235950 A1* | 10/2007 | Biedermann | B25D 17/088 279/19 |

FOREIGN PATENT DOCUMENTS

| | | | | |
|---|---|---|---|---|
| EP | 1619000 A1 * | 1/2006 | ........... | B25D 11/062 |
| EP | 1946894 A1 * | 7/2008 | ............... | B23Q 3/12 |
| EP | 2495078 A1 * | 9/2012 | ........... | B25D 17/088 |
| JP | 2005034913 | 2/2005 | | |

* cited by examiner

TOOL HOLDER CONNECTION SYSTEM

FIELD OF THE INVENTION

The present invention relates to a system by which a tool holder is attached to a spindle of a drill, particularly, a hammer drill.

BACKGROUND

A hammer drill includes a tool holder in which a cutting tool, such as a drill bit, can be supported and driven by the hammer drill. The hammer drill can often drive the cutting tool in three different ways, each being referred to as a mode of operation. The cutting tool can be driven in a hammer only mode, a rotary only mode and a combined hammer and rotary mode. A hammer drill will typically comprise a housing, an electric motor mounted in the main housing and a transmission mechanism by which the rotary output of the electric motor can either rotationally drive the cutting tool to perform the rotary only mode or repetitively strike the end of a cutting tool to impart axial impacts onto the cutting tool to perform the hammer only mode or rotationally drive and repetitively strike the cutting tool to perform the combined hammer and rotary mode.

In such types of hammer drill, a hollow spindle is typically mounted within the housing which can be rotationally driven by the electric motor. The spindle can be made in a one piece construction or from a number of component parts connected together. A tool holder, which holds the cutting tool, is firmly attached to the front end of the spindle. The electric motor rotatingly drives the cutting tool held within the tool holder by rotatingly driving the spindle within the housing via a gearing in the transmission.

A piston is typically mounted within the spindle and is connected to the motor via a reciprocating drive mechanism such as a crank mechanism or wobble bearing or similar such device within the transmission mechanism. A beat piece is mounted within the spindle towards the front of the spindle. The beat piece is capable of being axially slid over a limited range of movement. Also mounted within the spindle, in an axially slideable manner, between the piston and the beat piece is a ram.

The motor causes a cutting tool held in the tool holder to be struck by rotatingly driving the reciprocating drive mechanism to cause the piston to be reciprocatingly driven within the spindle. The piston in turn reciprocatingly drives the ram via an air cushion, the ram repetitively striking the beat piece as it does so. The beat piece transfers the impacts from the ram to the cutting tool. The design and operation of such hammer mechanisms is well known in the art and will not be described in any more detail. European Patent Publication No. EP1157788 describes an example of such a hammer drill.

The tool holder can be permanently attached to the front end of the spindle of the hammer drill. In such designs, the end of the spindle may form a component part of the tool holder with the spindle supporting a part of the cutting tool which is inserted into the end of the spindle. However, this restricts the range of cutting tools which can be used with the hammer drill as the tool holder will only be able to support certain cutting tools having specific connection arrangements which are compatible with that particular tool holder.

In order to broaden the range of tool cutting tools which can be used with a particular hammer drill, it is desirable to make the tool holder releasably connectable to the spindle. By making the tool holder releasably connectable, a number of different tool holders can be supplied with each individual hammer drill to enable that hammer drill to be used with a greater range of cutting tools. In this manner, one tool holder having one type of connection system can be removed from the spindle and replaced with another tool holder having a different connection system. European Patent Application No. EP1619000 discloses an example of a tool holder which can be releasably attached to a spindle.

One of the problems associated with releasably attachable tool holders is ensuring that the connection to and removal from the spindle is kept simple while maintaining a secure connection of the tool holder with the spindle when it is mounted on the spindle. Another problem with known attachable tool holders is that they significantly increase the overall length of the hammer drill when attached to the spindle.

DESCRIPTION

Figure 7:
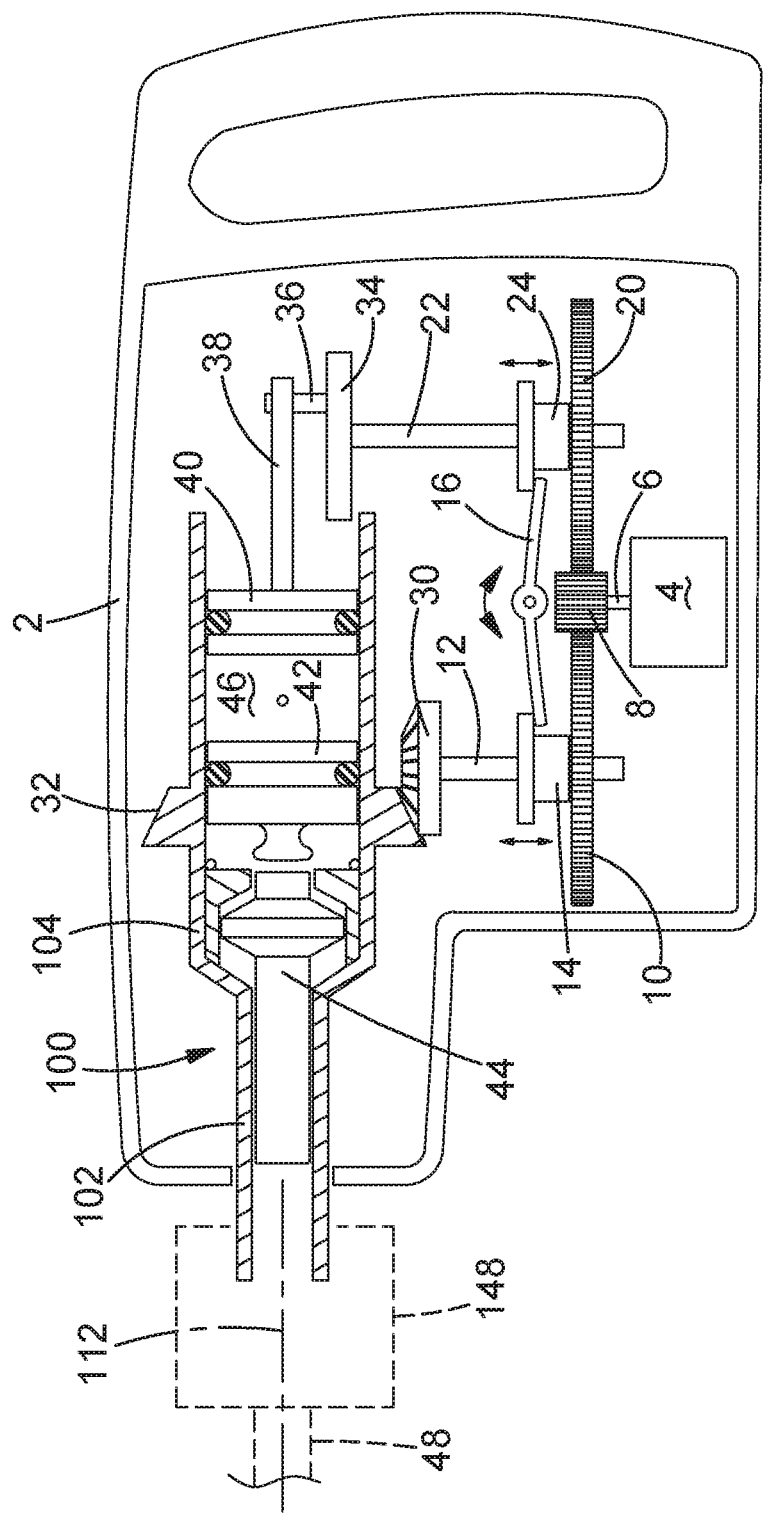
FIG. 7 shows a schematic diagram of a hammer drill.

Referring to the FIG. 7, the hammer drill comprises a housing 2 in which an electric motor 4 is mounted. Electric motor 4 has a drive shaft 6. A first gear 8 may be rigidly mounted on the drive shaft 6.

A second gear 10, which may be mounted on a first shaft 12, preferably meshes with the first gear 8. The second gear 10 may freely rotate about the first shaft 12 but is preferably axially fixed on the first shaft 12. Rotation of the first gear 8 preferably results in rotation of the second gear 10.

A collar 14 may be mounted on the first shaft 12 in an axially slideable but non-rotatable manner. When the collar 14 is in its lowest position, it preferably engages with the second gear 10 to transfer the rotary motion of the second gear 10 to the first shaft 12. When the collar 14 is in its upper most position, the collar 14 is preferably disengaged from the second gear 10 and as such, no rotary movement is transferred to the first shaft 12. Movement of collar 14 up and down the first shaft 12 is preferably controlled by a pivotal lever 16 which may be pivoted using a mode change knob (not shown) operated by a user.

A third gear 20, which may be mounted on a second shaft 22, preferably meshes with the first gear 8. The third gear 20 can freely rotate about the second shaft 22 but is preferably axially fixed on the second shaft 22. Rotation of the first gear 8 preferably results in rotation of the third gear 20.

A collar 24 is preferably mounted on the second shaft 22 in an axially slideable but non-rotatable manner. When the collar 24 is in its lowest position, it preferably engages with the third gear 20 to transfer the rotary motion of the third gear 20 to the second shaft 22. When the collar 24 is in its upper most position, the collar 24 is preferably disengaged from the third gear 20 and as such, no rotary movement is transferred to the second shaft 22. Movement of collar 24 up and down the second shaft 22 is preferably controlled by the pivotal lever 16 which may be pivoted using a mode change knob (not shown) operated by a user.

A bevel gear 30 may be mounted on the top of the first shaft 12. The bevel gear 30 preferably meshes with a drive gear 32 rigidly attached to a hollow spindle 100 rotationally mounted within the housing 2. Rotation of the first shaft 12 may rotatingly drive the hollow spindle 100 via the bevel gear 30 and drive gear 32.

A crank plate 34 may be mounted on the top of the second shaft 22. Mounted on the crank plate 34 in turn may be an eccentric pin 36. One end of a con rod 38 may be pivotally attached to the eccentric pin 36. The other end of the con rod 38 may be pivotally attached to a piston 40 mounted within the hollow piston 100. Rotation of the second shaft 22 preferably results in rotation of the crank plate 34 and eccentric pin 36. The rotation of the eccentric pin 36 preferably results in the reciprocating motion of the piston 40 within the hollow spindle 100.

The reciprocating piston 40 may reciprocatingly drive a ram 42 slideably mounted within the hollow spindle 100 via an air spring 46. The ram 42 in turn may repetitively strike a beat piece 44 which preferably transfers the impacts to a cutting tool 48 held within a tool holder 148 attached to the front of the hollow spindle 100.

The spindle 100, tool holder 148 and the connection mechanism by which the tool holder 148 may be mounted on the spindle 100 will now be described with reference to FIGS. 1 to 6.

The spindle 100 preferably has a longitudinal axis 112 and may comprise a front section 102 and a rear section 104, with the outer diameter of the front section 102 being less than that of the rear section 104.

A shoulder 106 may be formed on the outside of the spindle 100 between the front section 102 and rear section 104. Shoulder 106 preferably provides the transition between the outer diameters of the front section 102 and the rear section 104. The front section 102 may also have an inner diameter which is less than that of the rear section 104.

A tubular attachment sleeve 108 may be mounted on the front section 102 in an axially slideable manner along the longitudinal axis 112. Attachment sleeve 108 may have a rear wall 110 which preferably extends from the rear end of the attachment sleeve 108 radially inwards towards the front section 102 of the spindle 100. The attachment sleeve 108 and rear wall 110 may be integrally formed as a one piece construction. The range of axial movement of the attachment sleeve 108 on the front section 102 is preferably limited by the rear wall 110 engaging the shoulder 106 in the rearward direction and by the rear wall 110 engaging and being prevented from passing a circlip 114 (not shown in FIGS. 2 to 6) mounted in a circumferential groove formed on the front section 102 in the forward direction.

A first washer 116 may be mounted inside of the attachment sleeve 108 in a slideable manner. The first washer 116 preferably has an outer diameter which is slightly less than the inner diameter of the attachment sleeve 108. The inner diameter of the first washer 116 may be greater than that of the front section 102 of the spindle 100 to leave a radial gap 118 between the first washer 116 and the front section 102. The first washer 116 can axially slide inside of the attachment sleeve 108 along the longitudinal axis 112 between a rear position located in close proximity to the circlip 114 (due to it abutting against a third washer 126 described in more detail below) and a front position where it abuts against a second washer 120 axially fixed within a groove inside of the attachment sleeve 108. The plane of the first washer 116 preferably remains perpendicular to the longitudinal axis 112 as it slides axially within the attachment sleeve 108.

The inner diameter of the second washer 120 is preferably greater than that of the front section 102 of the spindle 100 to leave a radial gap 122 between the second washer 120 and the front section 102 which is greater than the radial gap 118 between the first washer 116 and the front section 102 of the spindle 100. The only function of the second washer 120 is to limit the forward axial movement of the first washer 116 inside of the attachment sleeve 108.

A first helical spring 124 may be sandwiched between the first washer 116 and the rear wall 110 for biasing the first washer 116 forward towards and into engagement with the second washer 120.

The third washer 126 is preferably mounted inside of the attachment sleeve 108 in a slideable manner between the first washer 116 and the circlip 114. The third washer 126 preferably has an outer diameter which is slightly greater than the inner diameter of the first washer 116. The third washer 126 can axially slide inside of the attachment sleeve 108 along the longitudinal axis 112 between a rear position where it abuts against the circlip 114 (and is prevented from passing it) and a front position where it abuts against the first washer 116, the third washer 126 being prevented from passing the first washer 116 due to the third washer 126 having an outer diameter which is slightly greater than the inner diameter of the first washer 116. The inner diameter of third washer 126 is preferably slightly larger than that of the front section 102 of the spindle 100 so that it can slide along the front section 102 but is unable to pass the circlip 114. The plane of the third washer 126 preferably remains perpendicular to the longitudinal axis 112 as it slides axially within the attachment sleeve 108.

A second helical spring 128, which may spiral outwardly in a conical manner in the rearward direction, is preferably sandwiched between the third washer 126 and the rear wall 110. Spring 128 preferably biases the third washer 126 forward towards and into engagement with the first washer 116.

Figure 1A:
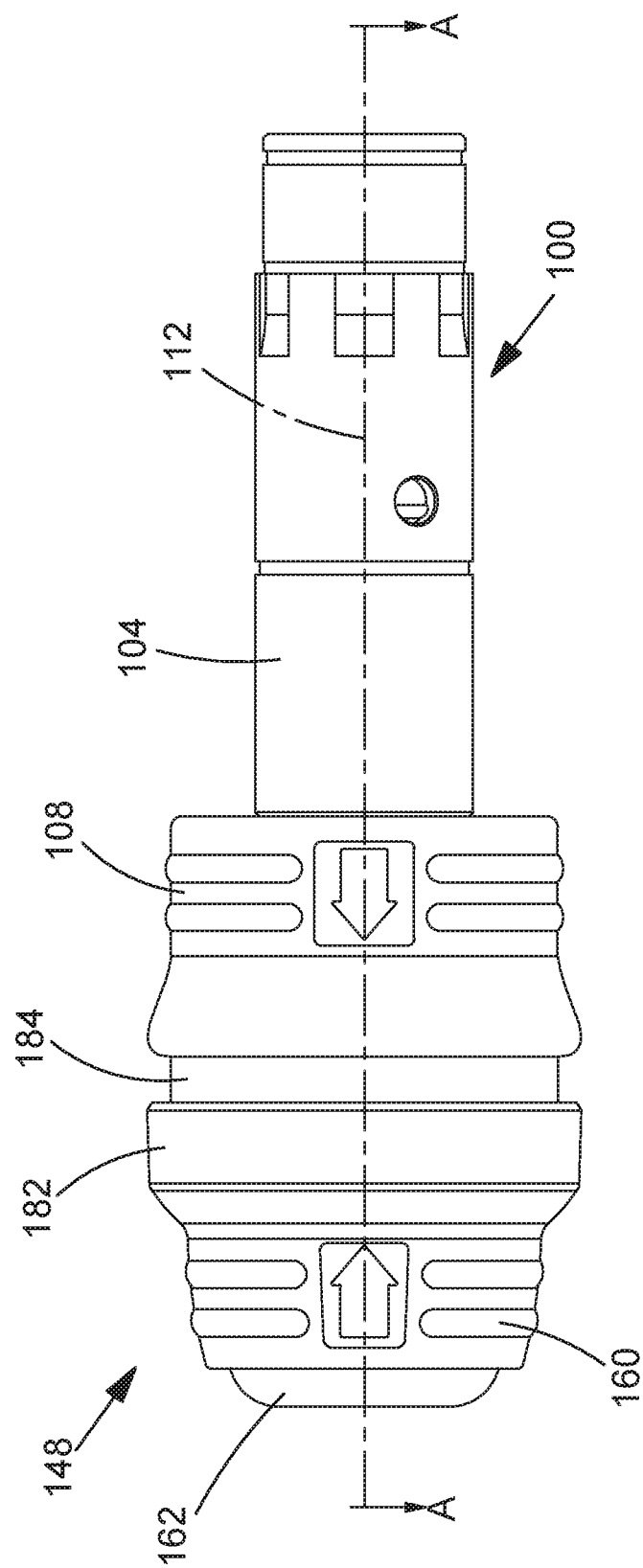
FIG. 1A shows a side view of the quick change tool holder attached to the spindle of a hammer drill in accordance with the present invention.
Figure 1B:
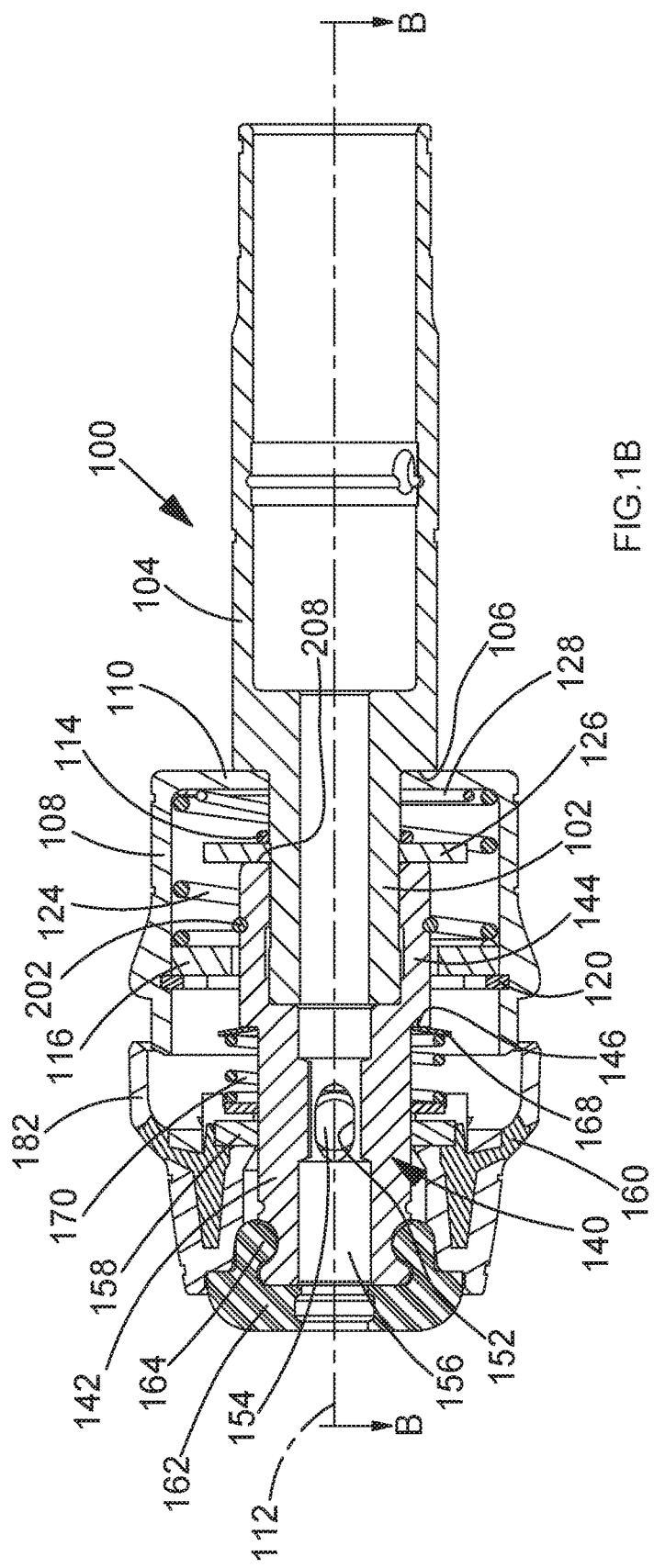
FIG. 1B shows a cross sectional view of the tool holder attached to the spindle in the direction of Arrows A in FIG. 1A.
Figure 1C:
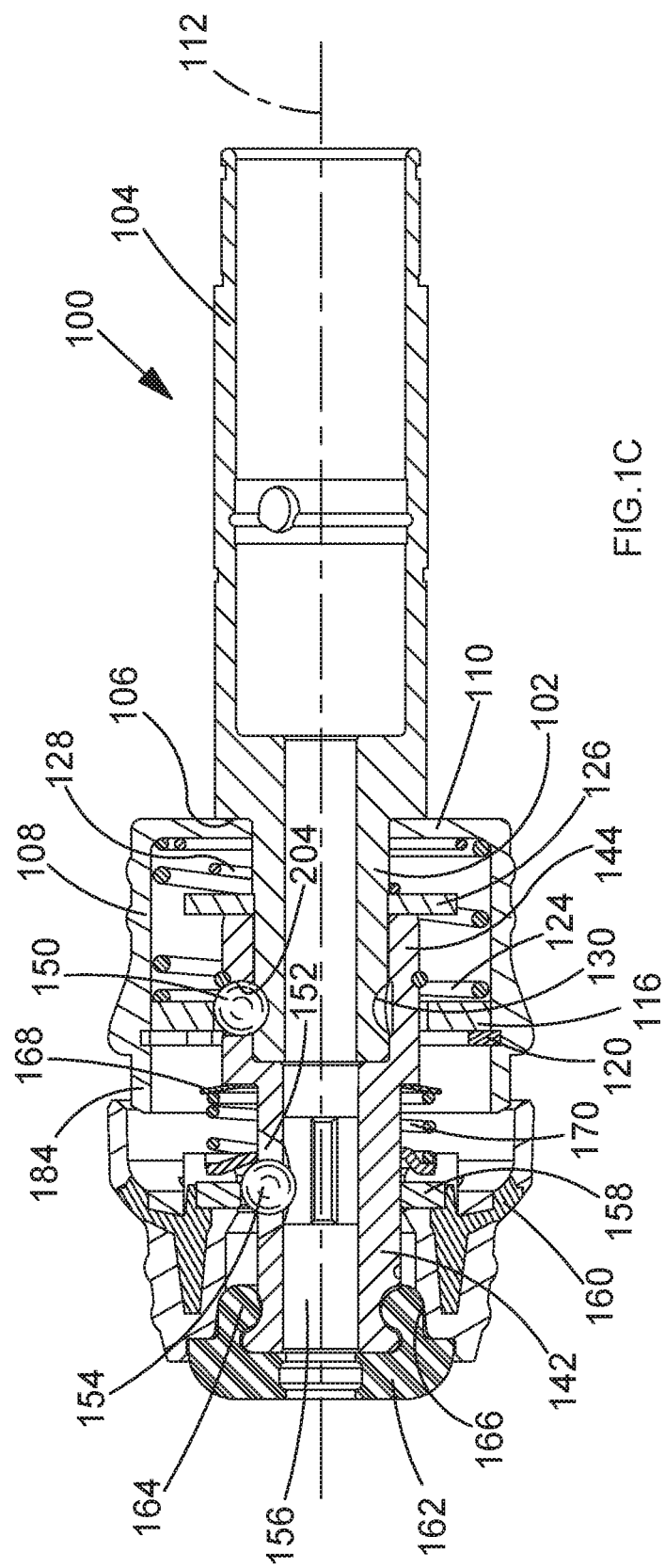
FIG. 1C shows a cross sectional view of the tool holder attached to the spindle in the direction of Arrows B in FIG. 1B.

Three indentations 130 may be formed circumferentially around the outside of the front section of the spindle 100 in a symmetrical fashion. The three indentations 130 preferably face towards the inner surface of the first washer 116 when the first washer 116 is located in its most forward position abutting the second washer 120 and the attachment sleeve 108 is in its most rearward position with the rear wall 110 abutting the shoulder 106 (as can be seen in FIG. 1C).

The tool holder 148 preferably comprises a tool holder spindle 140 having a front section 142 and a rear section 144. The tool holder spindle 140 has a longitudinal axis 146 which is preferably aligned with the longitudinal axis 112 of the spindle 100 when the tool holder 148 is attached to the spindle 100. The outer diameter of the front section 142 may be smaller than that of the rear section 144. A shoulder 146 may be formed on the outside of the spindle 140 between the front section 142 and rear section 144. Shoulder 146 preferably provides the transition between the outer diameters of the front section 142 and the rear section 144. The front section 142 may also have an inner diameter which is smaller than that of the rear section 144.

The inner diameter of the rear section 144 of the tool holder spindle 140 may be slightly greater than the outer diameter of the front section 102 of the spindle 100 to enable the front section 102 of the spindle 100 to be inserted into the rear section 144 of the tool holder spindle 140. The outer diameter of the rear section 144 of the tool holder spindle 140 may be slightly smaller than the inner diameter of the first washer 116 to enable the rear section 144 of the tool holder spindle 140 to pass through and slide inside of the first washer 116 without interfering with the movement of the first washer 116 when the tool holder 148 is being mounted on and attached to the front section 102 of the spindle 100.

The front section 142 of the tool holder spindle 140 preferably supports the tool locking mechanism which is a standard SDS PLUS type locking arrangement. The rear section 144 may support the spindle locking ball bearings 150 which are utilized to lock the tool holder 148 to the front section 102 of the spindle 100.

The front section 142 preferably comprises two apertures 152 formed through the wall of the front section 142, on opposite sides of the front section 142 facing each other and at the same axial position along the front section 142. A tool locking ball bearing 154 is preferably mounted inside of each of the apertures 152. The tool locking ball bearing 154 preferably have a diameter which is greater than the thickness of the wall of the front section 142 of the tool holder spindle 140. The tool locking ball bearings 154 can move over a limited range of movement in a radial direction, within the apertures 152 between a first position where a side of the tool locking ball bearings 154 project into a tubular passage 156 inside of the front section 142 of the tool holder spindle 140 and a second position where a side of the tool locking ball bearings 154 project radially outwardly from the front section 142 of the tool holder spindle 140.

A fourth washer 158 is preferably mounted on the front section 142 in an axially slideable manner. The inner diameter of the fourth washer 158 may be slightly larger than that of the outer diameter of the front section 142 of the tool holder spindle 140. A tubular locking sleeve 160 may be rigidly attached to the fourth washer 158 and preferably slides axially with the fourth washer 158.

A rubber nose 162 is preferably attached to the front of the front section 142 of the tool holder spindle 140. The rubber nose 162 preferably has an integral rubber ring 164 which locates within a radial groove 166 formed circumferentially around the end of the front section 142 in order to attach the nose 162 to the front of the front section 142 of the tool holder spindle 140. The fourth washer 158 can axially slide on the front section 142 of the tool holder spindle 140 between a rear position where it is in close proximity to a fifth washer 168 which abuts against the shoulder 146 between the front and rear sections 142, 144 of the tool holder spindle 140 and a forward position where the locking sleeve 160 abuts against the nose 162.

A third helical spring 170 may be sandwiched between the fourth washer 158 and the fifth washer 168 which abuts against the shoulder 146 on the tool holder spindle 140. Spring 170 preferably biases the fourth washer 158 forward towards its most forward position where the locking sleeve 160 abuts against the nose 162.

When the fourth washer 158 is in its forward position where the locking sleeve 160 abuts against the nose 162, the inner surface of the fourth washer 158 preferably faces towards the two apertures 152. When the fourth washer 158 is in this position, the inner surface of the fourth washer 158 engages with the tool locking ball bearings 154 and forces them to move radially inwards to a position within the apertures 152 where part of the tool locking ball bearings 154 project into the tubular passage 156 inside of the front section 142 of the tool holder spindle 140. The tool locking ball bearings 154 are preferably prevented from moving from these positions until the fourth washer 158 is slid rearwardly towards the fifth washer 168 to allow the tool locking ball bearings 154 to move radially outwardly.

In order to lock a cutting tool 48, such as a drill bit, into the tool holder 148, the operator slides the fourth washer 158 rearwardly against the biasing force of the third spring 170 using the locking sleeve 160. This allows the tool locking ball bearings 154 to move radially outwards. The rear end of the cutting tool 48 is then inserted into the tubular passage 156 of the front section 142 of the tool holder spindle 140 until grooves of the SDS PLUS locking system on the cutting tool align with the tool locking ball bearings 154. The fourth washer 158 and locking sleeve 160 are then allowed to return to their forward position due to the biasing force of the third helical spring 170, the fourth washer 158 moving the tool locking ball bearings 154 into the grooves of the cutting tool 48 and locking them in that position. The cutting tool 48 is accordingly prevented from exiting the tool holder 148 due to the tool locking ball bearings 154 being located and held within the grooves of the cutting tool 48.

The cutting tool 48 can be released by sliding the fourth washer 158 rearwardly against the biasing force of the third spring 170 using the locking sleeve 160, moving the fourth washer out of the way of the tool locking ball bearings 154 allowing them to move radially outwards, out of the grooves of the cutting tool 48. The cutting tool 48 can then be slid out of the front section 142 of the tool holder spindle 140.

The rear section 182 of the locking sleeve 160 has been preferably enlarged so that it has a diameter greater than a front section 184 of the attachment sleeve 108. This allows the rear section 182 of the locking sleeve 160 to slide over the front section 184 of the attachment sleeve 108 when either the locking sleeve 160 is slid rearward or the attachment sleeve 108 is slid forward, the sliding movement of either of the two sleeves not engaging nor having any interaction with the other sleeve.

The rear section 144 preferably comprises three apertures 204 formed through the wall of the rear section 144 in a symmetrical fashion at the same axial position along the rear section 144. The number of apertures 204 and the position of the apertures 204 around the rear section 144 preferably corresponds to the number and positions of the indentations 130 on the front section 102 of the spindle 100. Mounted inside of each of the apertures 204 is a spindle locking ball bearing 150 which preferably has a diameter which is greater than the thickness of the wall of the rear section 144 of the tool holder spindle 140.

The spindle locking ball bearings 150 can move over a limited range of movement in a radial direction within the apertures 204 between a first position where a side of the spindle locking ball bearings 150 project into a tubular passage 200 inside of the rear section 144 of the tool holder spindle 140 and a second position where a side of the spindle locking ball bearings 150 project radially outwardly from the rear section 144 of the tool holder spindle 140. A circlip 202 preferably holds the spindle locking ball bearings 150 within the apertures 204.

Figure 2A:
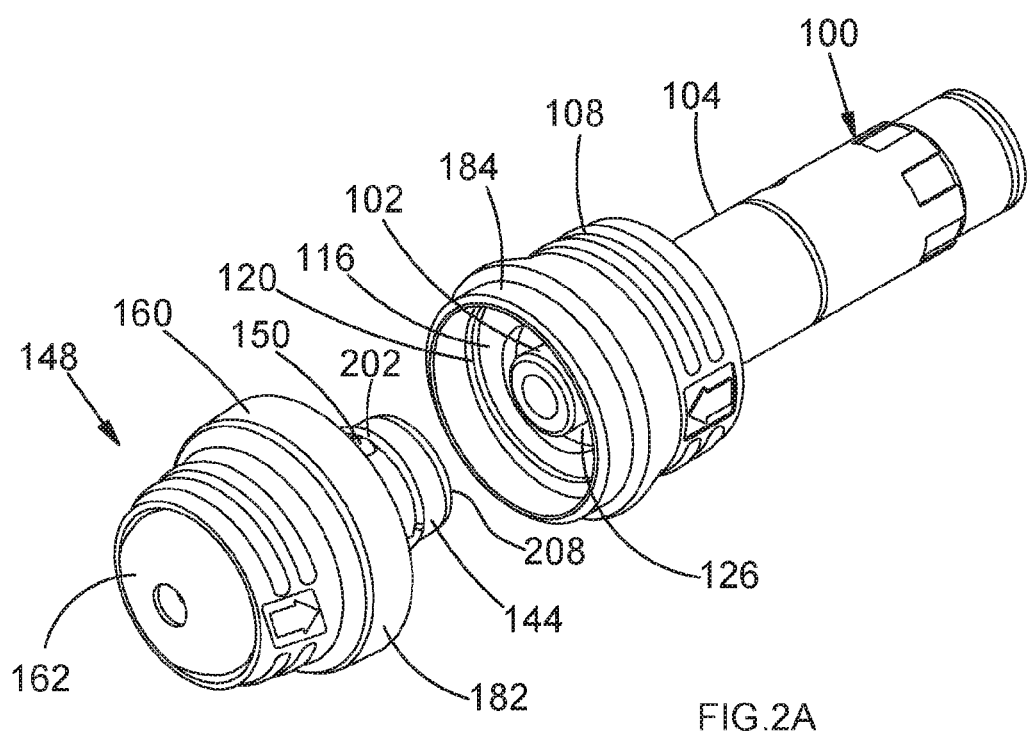
FIG. 2A shows the tool holder separated from the spindle.
Figure 2B:
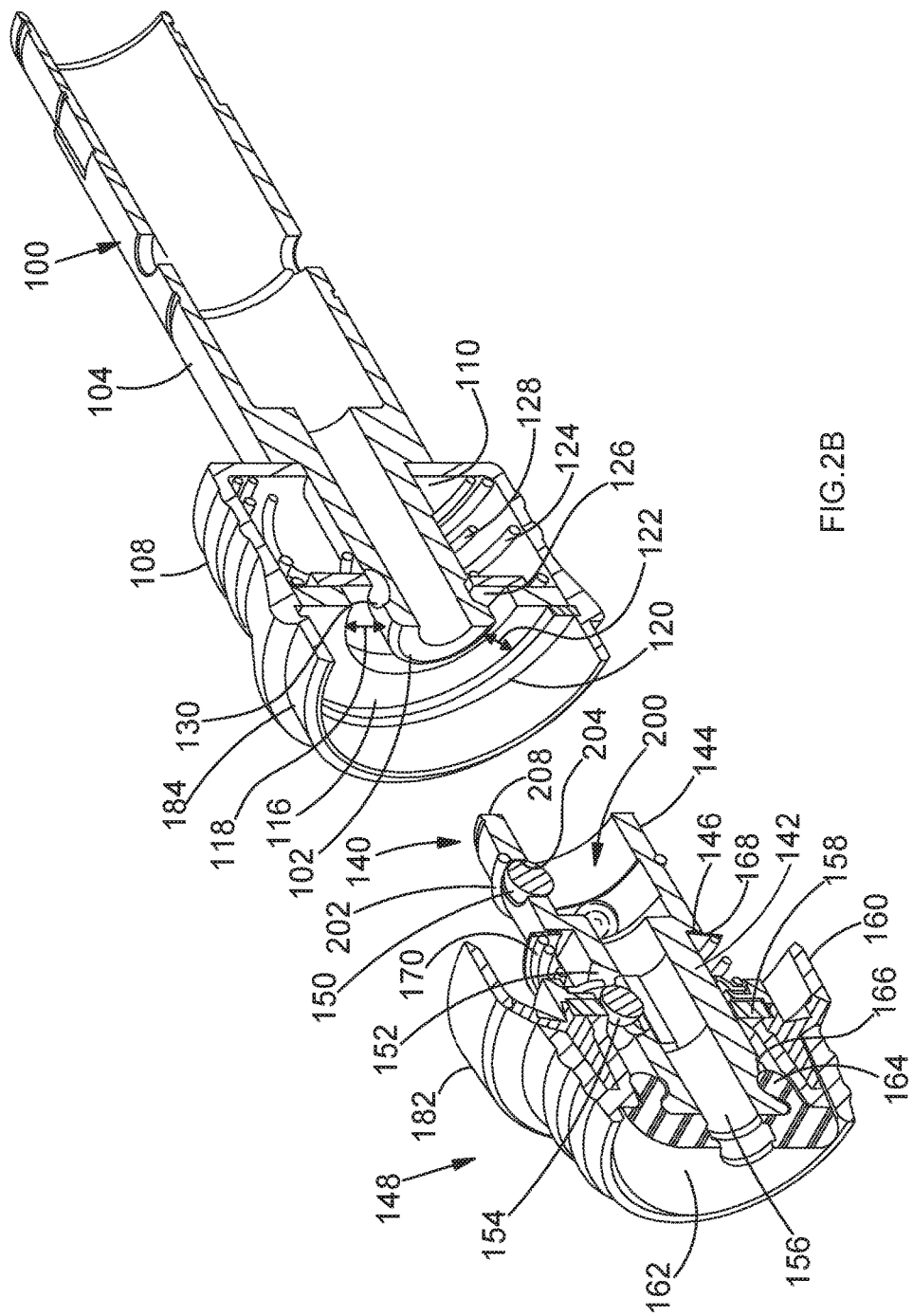
FIG. 2B shows a vertical cross section of the tool holder separated from the spindle as shown in FIG. 2A.

The method of attaching and removing the tool holder 148 from the spindle 100 will now be described. FIGS. 2A and 2B show the tool holder 148 located remotely from the spindle 100. The first and third washers 116, 126 are preferably biased to their most forward positions inside of the attachment sleeve 108 by the two helical springs 124, 128, with the first washer 116 preferably abutting against the second washer 120, and the third washer 126 preferably abutting against the first washer 116.

Figure 3A:
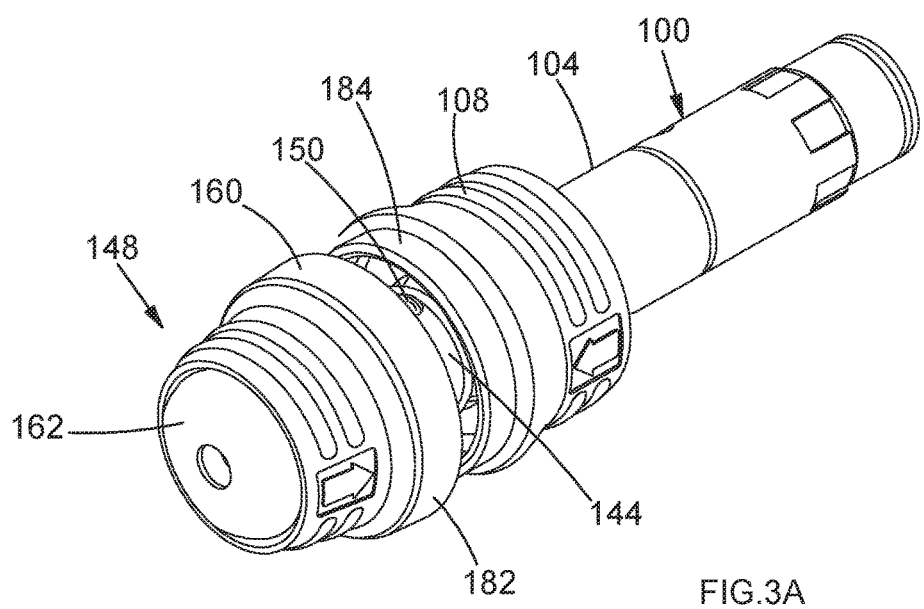
FIG. 3A shows the tool holder engaging the end of the spindle.
Figure 3B:
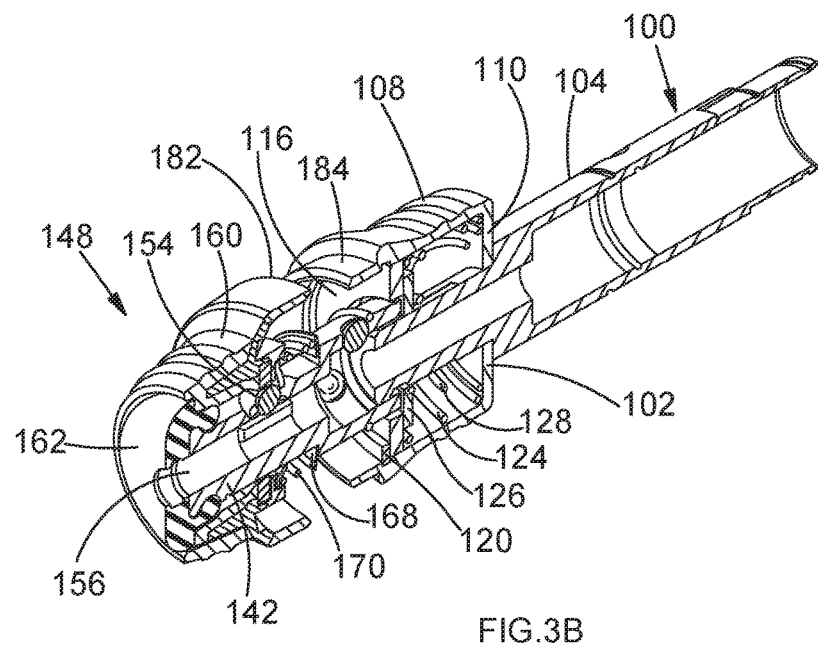
FIG. 3B shows a vertical cross section of the tool holder engaging the end of the spindle as shown in FIG. 3A.

The front section 102 of the spindle 100 may be inserted into rear section 144 of the tool holder spindle 140 as shown in FIGS. 3A and 3B. As it is inserted, the rear section 144 of the tool holder spindle 140 preferably passes through the first washer 116 without engaging or coming into contact with the first washer 116, the rear end 208 of the rear section 144 engaging with the third washer 126 as it slides over the front section 102 of the spindle 100.

Figure 4A:
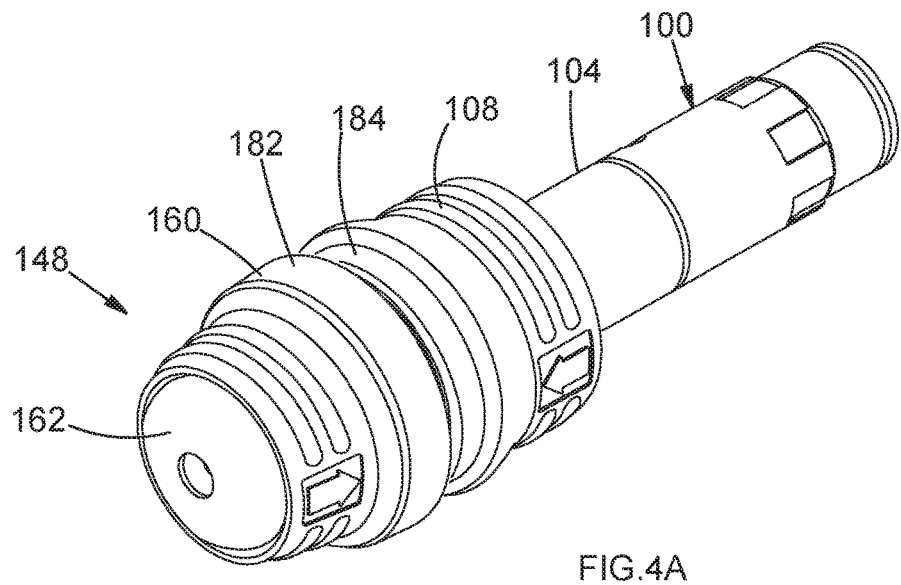
FIG. 4A shows the tool holder sliding onto the spindle.
Figure 4B:
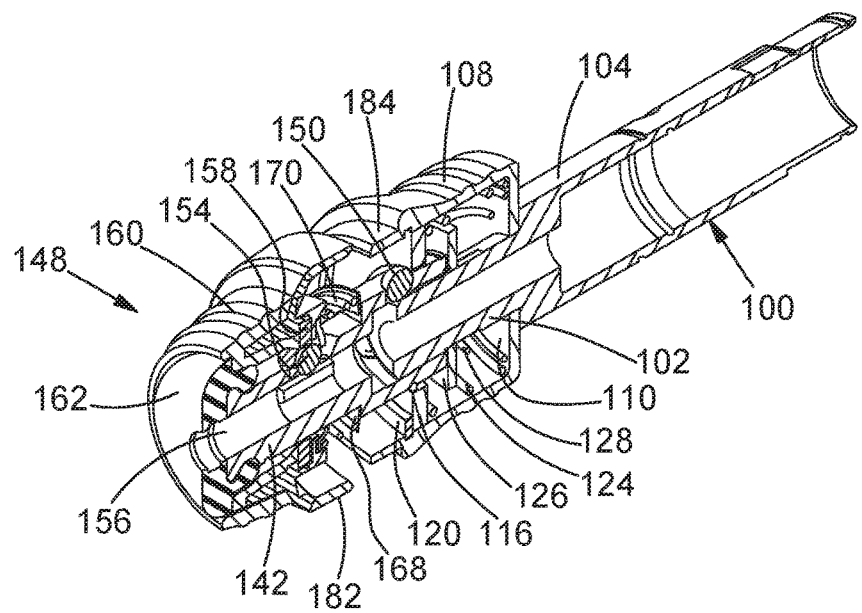
FIG. 4B shows a vertical cross section of the tool holder sliding onto the spindle as shown in FIG. 4A.
Figure 5A:
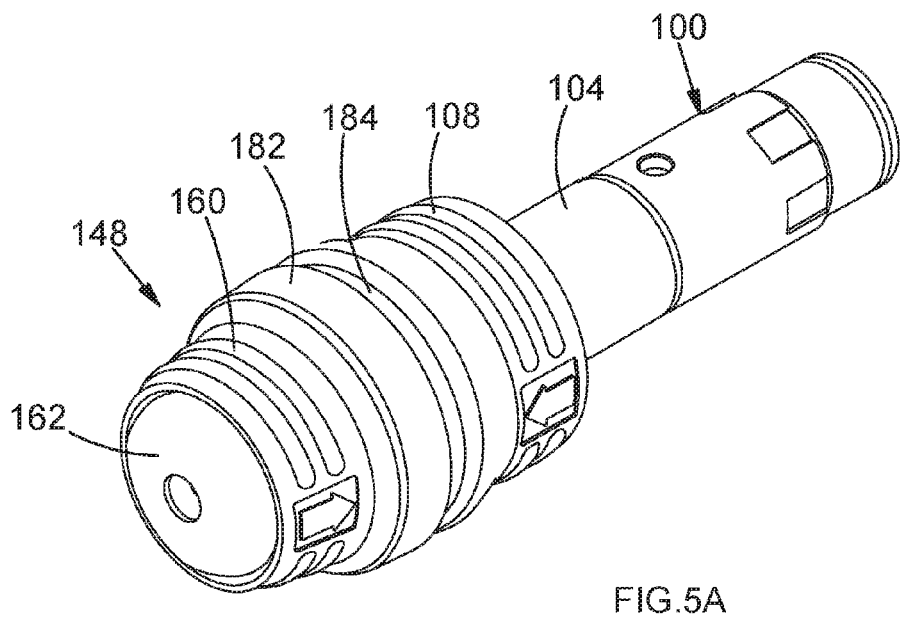
FIG. 5A shows the tool holder locked onto the spindle.
Figure 5B:
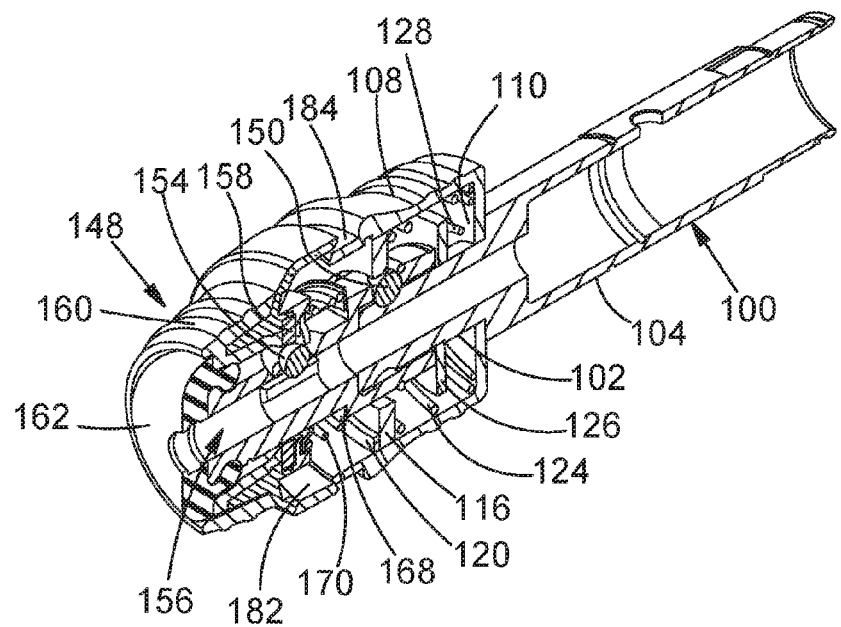
FIG. 5B shows a vertical cross section of the tool holder locked onto the spindle as shown in FIG. 5A.
Figure 6A:
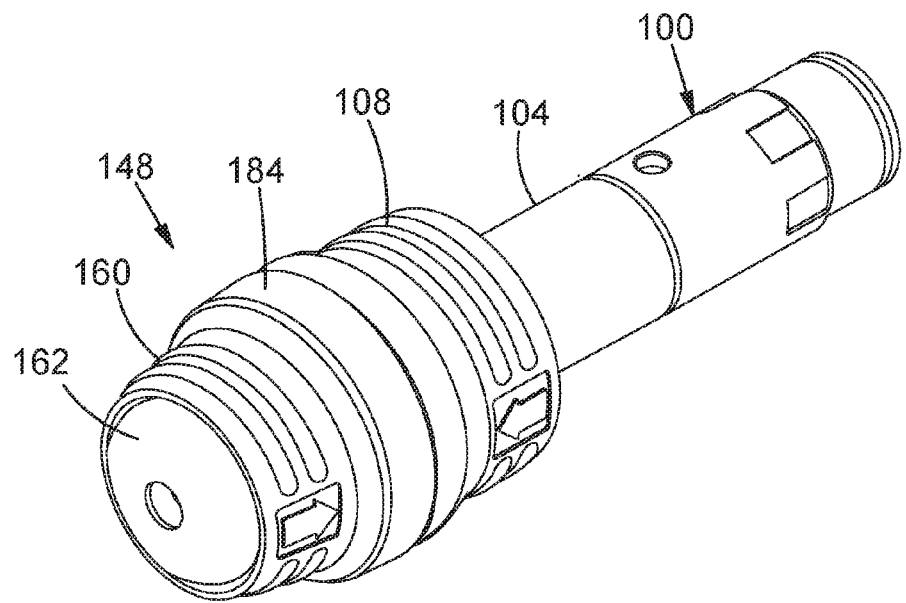
FIG. 6A shows the tool holder being released from the spindle.
Figure 6B:
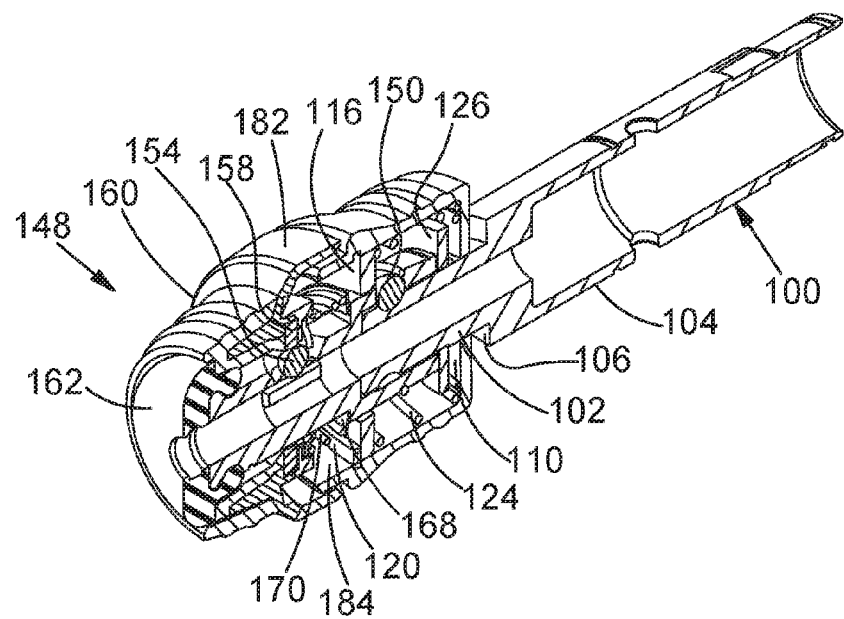
FIG. 6B shows a vertical cross section of the tool holder being released from the spindle as shown in FIG. 6A.

As the front section 102 continues to slide into the rear section 144 of the tool holder spindle 140, the rear end 208 preferably pushes the third washer 126 rearwardly against the biasing force of the second helical spring 128 as shown in FIGS. 4A and 4B. The force applied to the third washer 126 is preferably transferred to the rear wall 110 via the second helical spring 126 resulting in the rear wall 110 and attachment sleeve 108 moving rearwardly on the front section 102 until the rear wall 110 engages with the shoulder 106 on the spindle 100. The attachment sleeve 108 and rear wall 110 are then held in their rearmost positions due to the biasing force of the second helical spring 128. As the attachment sleeve 108 and rear wall 110 are then held in their rearmost positions, the third washer 126 continues to move rearwardly inside of the attachment sleeve 108 towards the rear wall 110 by the insertion of the rear section 144 of the tool holder spindle 140 into the attachment sleeve 108.

As the front section 102 of the spindle 100 continues to slide into the rear section 144 of the tool holder spindle 140, the spindle locking ball bearings 150 engage with the end of the front section 102 of the spindle 100 and are pushed to their radially outward position, out of the tubular passage 200 inside of the rear section 144 of the tool holder spindle 140. When the spindle locking ball bearings 150 are in their radially outer positions, they are unable to pass through the first washer 116 as the inner diameter of the first washer 116 is smaller than the radial position of the spindle locking ball bearings 150. As the front section 102 continues to slide into the rear section 144 of the tool holder spindle 140, the spindle locking ball bearings 150 travel along the outside of the front section 102 in their radially outer position until they engage with the first washer 116 and commence pushing the first washer 116 rearwardly against the biasing force of the first helical spring 124. The first and third washers 116, 126 will both continue to be pushed rearwardly inside of the attachment sleeve 108 against the biasing force of the two helical springs 124, 128 by the spindle locking ball bearings 150 and the rear end 208 of the rear section 144 of the tool holder spindle 140 respectively, until the third washer 126 is adjacent the circlip 114 and the spindle locking ball bearings 150 align with the indentations 130. Some rotational movement of the tool holder 148 on the spindle 100 may be required to provide precise alignment of the spindle locking ball bearings 150 and the indentations 130.

Once aligned, the spindle locking ball bearings 150 are able to enter the indentations 130. The biasing force of the first helical spring 124 will then push the first washer 116 forward causing the first washer 116 to push the spindle locking ball bearings 150 into the indentations 130. A chamfer (not shown) on the inner surface of the first washer 116 assists in moving the spindle locking ball bearings 150 into the indentations 130. The first washer 116 then moves to the same axial position as the spindle locking ball bearings 150 where it abuts against the second washer 120, locking the spindle locking ball bearings 150 into the indentations 130. The tool holder is then locked onto the spindle 100 by the spindle locking ball bearings 150 being located and held within the indentations 130 by the first washer 116.

In order to release the tool holder 148 from the front section 102 of the spindle 100, the attachment sleeve 108 is preferably slid forward against the biasing force of the second helical spring 128, the rear wall moving away from the shoulder 106 and towards the cir-clip 114 as it does so. As the attachment sleeve 108 moves forward, the first washer 116 preferably moves forward with the attachment sleeve 108 due to the biasing force of the first spring 124. As the first washer 116 moves forward of the spindle locking ball bearings 150, ball bearings 150 move radially outwardly out of the indentations 130 towards the inner surface of attachment sleeve 108. The tool holder 148 is then urged off the end of the front section 102 of the spindle 100 by the biasing force of the second spring 128 urging the third washer 126 away from the rear wall 110 which in turn pushes the rear end 208 of the rear section 144 of the tool holder spindle away from the rear wall 110. The first washer 116 is moved sufficiently far forward by the forward movement of the attachment sleeve 108 that it passes the end of and locates to a position forward of the front section 102 of the spindle 100 by a sufficient amount to allow the spindle locking ball bearings 150 to move radially inwardly after sliding along and then moving past the front section 102 of the spindle 100 in order to pass through the first washer 116 whilst located in their radially inner position. The tool holder can then be removed and the attachment sleeve released 108.

While the present invention has been described in relation to a hammer drill, it will be appreciated that it is applicable to any power tool or other tools requiring a tool holder.

The invention claimed is:

1. A tool holder connection system for a drill comprising:
a first spindle having a first end, a second end, and a first spindle connection section formed at the first end of the first spindle, wherein the first spindle connection section comprises an indentation;
a locking ring slideably mounted on the first spindle, the locking ring being slidable relative to the first spindle connection section;
a first biasing mechanism biasing the locking ring towards an indentation position where the locking ring surrounds the indentation;
a second spindle having a first end, a second end and a second spindle connection section formed at the first end of the second spindle, the second spindle connection section comprising a tubular passage for receiving the first spindle connection section,
the second spindle connection section comprising a moveable locking element mounted within an aperture formed through the wall of the second spindle connection section, the moveable locking element being movable radially between a first position where the locking element extends into the tubular passage and a second position where the locking element extends radially outwardly from the second spindle connection section;

wherein, when the first spindle is locked to second spindle, the first spindle connection section is located within the tubular passage of the second spindle connection section with the indentation being aligned with the locking element, the locking element being held in the first position in engagement with the indentation by the locking ring which is located in the indentation position;

wherein, the first spindle can be unlocked from the second spindle by sliding the locking ring away from the indentation position against the biasing force of the first biasing mechanism, the locking ring moving from the second end of the first spindle and towards the second end of the second spindle, and the locking element moving to the second position to disengage from the indentation; and wherein, when the first spindle is unlocked and disengaged from the second spindle, the locking ring radially surrounds the indentation.

2. A tool holder connection system as claimed in claim 1 wherein, when the first spindle is unlocked and disengaged from the second spindle, the first spindle can be engaged with and locked to the second spindle by the insertion of the first connection section into the tubular passage of the second connection section until the first connection section engages with the locking element to move the locking element to the second position;

wherein, as the first connection section is further inserted into the tubular passage of the second connection section, the locking element in the second position engages the locking ring to move the locking ring away from the indentation position against the biasing force of the first biasing mechanism.

3. A tool holder connection system as claimed in claim 1 wherein the inner diameter of the locking ring is greater than the outer diameter of the second connection section wherein, when the first connection section is located in the tubular passage of the second connection section, and the locking ring surrounds and is capable of sliding over the second connection section.

4. A tool holder connection system as claimed in claim 1 further comprising a sleeve slideably mounted on the first spindle which surrounds the locking ring, the locking ring being capable of sliding relative to the first connection section inside of the sleeve.

5. A tool holder connection system as claimed in claim 4 wherein the first biasing mechanism is located between the sleeve and the locking ring and urges the locking ring into engagement with a stop located inside of the sleeve.

6. A tool holder connection system as claimed in claim 4 further comprising a stop formed on the first spindle to limit the amount by which the sleeve can slide of the first spindle.

7. A tool holder connection system as claimed in claim 4 wherein the locking ring and/or sleeve are slideably mounted on the first connection section.

8. A tool holder connection system as claimed in claim 1 wherein the locking element is a ball bearing.

\* \* \* \* \*